Dec. 30, 1941.  J. SCHAVOCKY  2,268,087
GARBAGE CART
Filed July 9, 1941   2 Sheets-Sheet 1
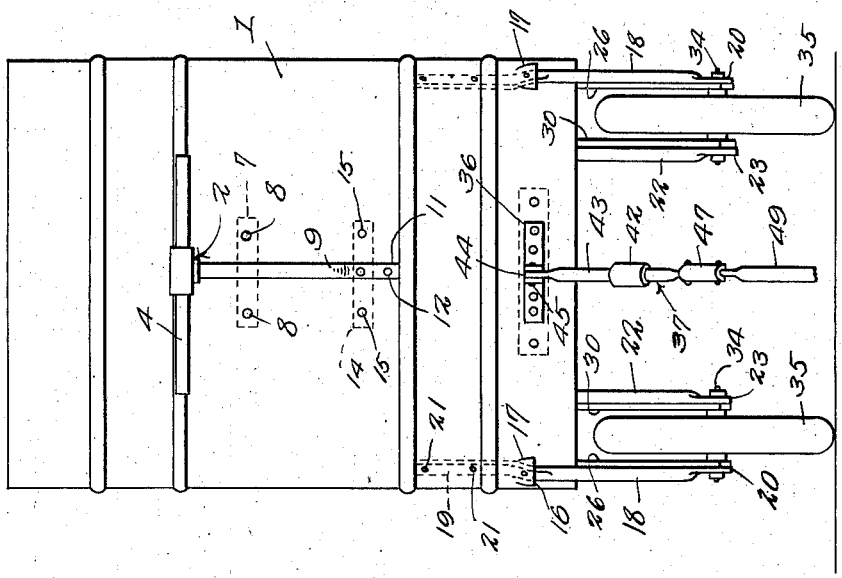
J. I. Schavocky,
INVENTOR.
BY Chsnowles Dec. 30, 1941.  J. SCHAVOCKY  2,268,087
GARBAGE CART
Filed July 9, 1941  2 Sheets-Sheet 2
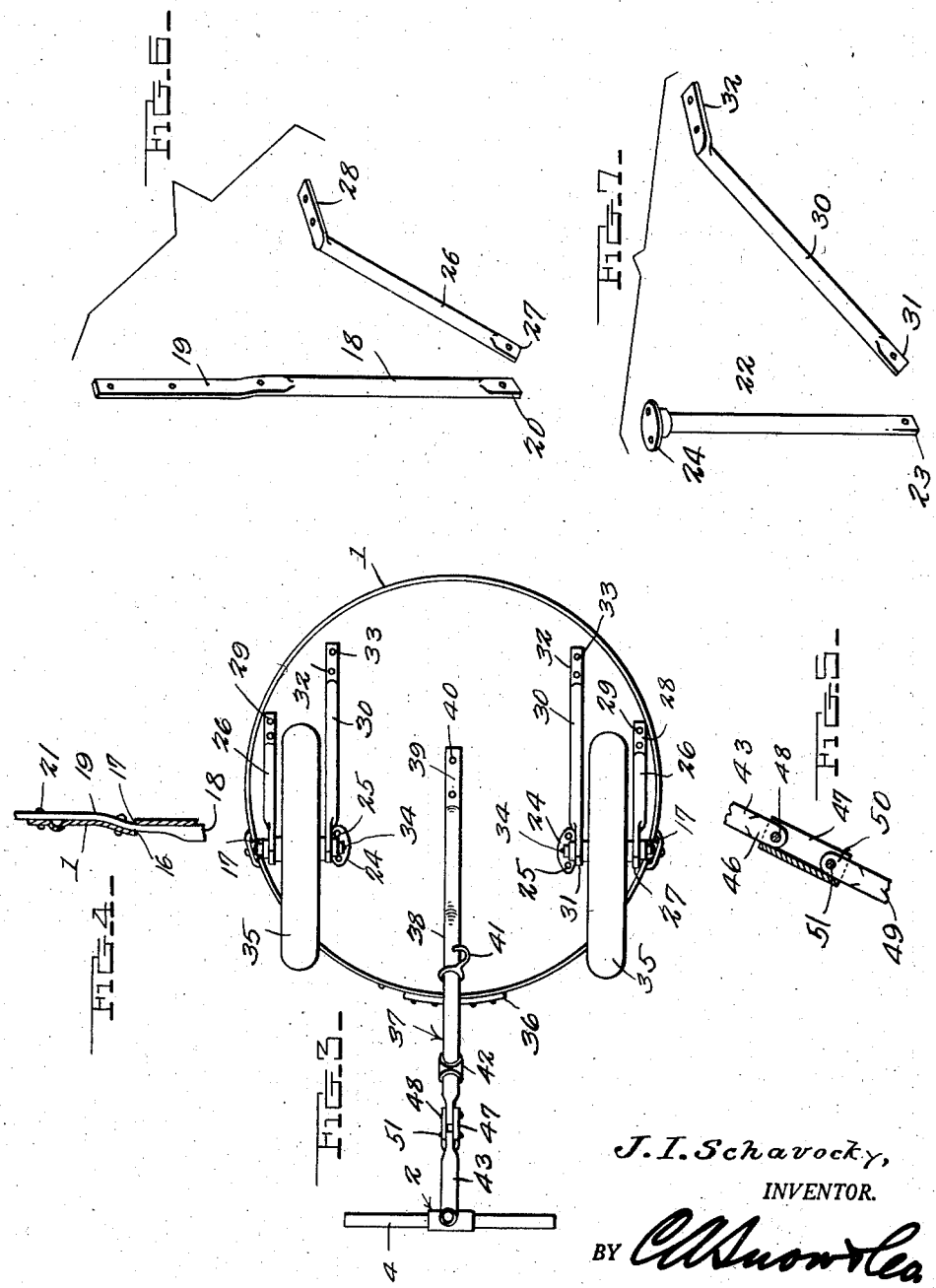
J. I. Schavocky,
INVENTOR.
BY Patented Dec. 30, 1941

2,268,087

UNITED STATES PATENT OFFICE 2,268,087

GARBAGE CART

John Schavocky, Chicago, Ill.

Application July 9, 1941, Serial No. 401,668

2 Claims. (Cl. 280—51)

This invention aims to provide a cart, adapted to be used by janitors, for collecting garbage in apartment houses, primarily, the construction being such that it will not be necessary to carry a heavy can of garbage bodily, upstairs or down, it being possible to move the cart, on its wheels, from floor to floor, and the construction being such that the can or body of the cart may be dumped readily.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a garbage cart constructed in accordance with the invention, parts being broken away;

Fig. 2 is a side elevation wherein the cart is viewed at right angles to the showing of Fig. 1;

Fig. 3 is a bottom plan;

Figs. 4, 5, 6 and 7 are detail views showing structural features.

The device forming the subject matter of this application preferably is made of metal throughout, saving as hereinafter specified. It comprises a cylindrical body 1, open at the top, and closed at the bottom.

A horizontally disposed, T-shaped handle 2 is provided, and comprises a stem 3, equipped at its outer end with a cross grip 4. The inner end of the stem 3 has a downwardly extended, flattened foot 5 held by securing elements 6 on the body 1, one of the securing elements 6 engaging a washer strip 7, disposed transversely of the body 1, and held on the inner surface thereof by securing members 8. An arcuate brace 9 is provided, and is supplied at its upper end with a T 10, through which the stem 3 of the handle 2 passes. At its lower end, the brace 9 has a flattened, depending foot 11, held by securing elements 12 on the body 1, one of the securing elements 12 engaging a washer strip 14, held on the inner surface of the body by securing elements 15.

At its sides, the body 1 is provided with transverse slits 16, and above the slits, the constituent materials of the body 1 is struck outwardly to form downwardly opening sockets 17.

Legs 18 are provided. The legs 18 have flat upper ends 19, and flat lower ends 20. The flat upper ends 19 of the legs 18 are inserted upwardly through the sockets 17, from the outside, so that said flat upper ends of the legs lie inside the body 1. The upper ends of the legs 18 are attached by securing elements 21 to the body 1.

Straight hangers 22 are shown, and have flattened lower ends 23. As their upper ends, the hangers 22 carry fixed head plates 24. The head plates 24 are attached by securing elements 25 to the bottom of the cylindrical body 1.

Braces 26 are supplied and have flattened lower ends 27. At its upper end, the brace 26 has a flattened, angularly disposed head 28. The heads 28 are fastened to the bottom of the body 1 by securing elements 29.

Braces 30 are disclosed in the drawings, the braces having flattened lower ends 31, and flattened heads 32. The heads 32 are secured to the bottom of the body 1 by attaching elements 33. The braces 30 are disposed between the braces 26, as Fig. 3 will show.

The flattened lower ends 27 of the braces 26 are overlapped upon the flattened lower ends 20 of the legs 18. The flattened lower ends of the braces 30, designated by the numeral 31, are overlaped on the flattened lower ends 23 of the hangers 20.

In each of the legs 18, and in the corresponding hanger 22, and in the braces 26 or 30, is mounted an axle 34, which may be a bolt. Ground wheels 35 are journaled for rotation on the axles 34 and are mounted between the braces 26 and 30, and, more specifically, between the flattened ends 27 and 31 of those braces. The wheels 35 may be equipped with pneumatic tires, if desired, in the interest of cutting down noise, and in the interest of making the cart easy to handle.

A frame 37 is provided, the frame comprising a downwardly curved and upwardly extended main member 38, in the form of a rod, having a flattened upper or rear end 39, secured to the bottom of the body 1, by attaching elements 40. A suspension element, such as a hook, marked by the numeral 41, is provided, and has an eye which receives the main member 38, the said eye being slidably mounted on the main member. The rear end of the main member 38 carries a T 42.

The numeral 43 designates a standard, passing through the T 42. The standard 43 is provided at its upper end with a flattened portion 44, received between the forwardly presented arms of angle brackets 36 that are secured to the body 1, the standard is fixed to the brackets by a securing element 45. The standard 43 is provided with a flattened lower end 46.

The numeral 47 designates a trough-shaped rule joint member, and the flattened lower end 46 of the standard 43 extends into the upper end of the said rule joint member. The flattened lower end 46 of the standard 43 is connected to the rule joint member 47 by a pivot element 48. The numeral 49 designates a prop. The prop 49 has a flattened upper end 50. The flattened upper end 50 of the prop 49 is received in the lower end of the rule joint member 47, and is connected thereto by a pivot element 51.

When it is desired to rest the cart in an upright position, as shown in Fig. 1, the prop 49 is swung to the left, until it is in alinement with the standard 43, the parts being held in that position by the rule joint member 47. When the prop 49 is of no further service, it is swung forwardly, and is engaged with the hook 41, it being possible to engage the hook 41 readily with the prop, because the hook is mounted to slide longitudinally of the main member 38 of the frame 37, and to rotate thereon.

The device can be moved readily about on a level surface, and can be moved upstairs and downstairs as well, thereby rendering it unnecessary for a janitor to tote a laden garbage can about by main strength, carrying all the weight of the can and its contents.

When it is desired to dump the body 1, this can be done by raising the bottom of the can, using the cross grip 4 of the handle 2 as a ground-engaging fulcrum.

A cylindrical can has been shown, but it will be understood that the can may be of any desired cross section.

The device is simple in construction, but it will be found thoroughly advantageous for the ends in view.

The axles 34 are offset laterally with respect to the longitudinal axis of the body 1, and when the prop 49 is in use, the center of mass of the body is between the axles and the prop, and the device will not tend to tip over, toward the right in Fig. 1.

Having thus described the invention, what is claimed is:

1. A one-man garbage cart comprising a body having slits in its sides, the constituent material of the body being struck outwardly, above the slits, to form sockets, legs located on the outside of the body, the upper ends of the legs extending upwardly through the sockets, and being located on the inside of the body, securing elements connecting the upper end of the legs with the body, wheels supported for rotation on the legs, and a handle assembled with the body.

2. A one-man garbage cart comprising a body, ground wheels whereon the body is mounted; a frame comprising a downwardly curved main member having its forward end secured to the bottom of the body, a standard having its upper end secured to the side of the body, and means for connecting the rear end of the main member to the standard; a prop, a rule joint connection between the upper end of the prop and the lower end of the standard, and a suspension element movably mounted on the main member, for engagement with the prop.

JOHN SCHAVOCKY.